(12) United States Patent
Agarwal et al.

(10) Patent No.: US 9,069,587 B2
(45) Date of Patent: Jun. 30, 2015

(54) SYSTEM AND METHOD TO CACHE HYPERVISOR DATA

(71) Applicant: STEC, Inc., Santa Ana, CA (US)

(72) Inventors: Anurag Agarwal, Pune (IN); Anand Mitra, Pune (IN); Prasad Joshi, Maharashtra (IN); Kanishk Rastogi, Maharashtra (IN)

(73) Assignee: STEC, INC., Santa Ana, CA (US)

( * ) Notice: Subject to any disclaimer, the term of this patent is extended or adjusted under 35 U.S.C. 154(b) by 0 days.

(21) Appl. No.: 13/662,183

(22) Filed: Oct. 26, 2012

(65) Prior Publication Data

US 2013/0111474 A1    May 2, 2013

Related U.S. Application Data

(60) Provisional application No. 61/553,619, filed on Oct. 31, 2011.

(51) Int. Cl.
| | |
|---|---|
| *G06F 9/46* | (2006.01) |
| *G06F 9/455* | (2006.01) |
| *G06F 11/00* | (2006.01) |
| *G06F 13/00* | (2006.01) |
| *G06F 21/00* | (2013.01) |
| *G06F 9/50* | (2006.01) |
| *G06F 12/08* | (2006.01) |
| *G06F 9/48* | (2006.01) |

(52) U.S. Cl.
CPC ............ *G06F 9/455* (2013.01); *G06F 9/45558* (2013.01); *G06F 9/5077* (2013.01); *G06F 2009/4557* (2013.01); *G06F 12/0888* (2013.01); *G06F 12/0842* (2013.01); *G06F 12/0866* (2013.01); *G06F 2212/152* (2013.01); *G06F 9/4856* (2013.01)

(58) Field of Classification Search
USPC .......................... 718/1–105; 711/6, 111–113
See application file for complete search history.

(56) References Cited

U.S. PATENT DOCUMENTS

| | | | |
|---|---|---|---|
| 6,389,509 B1* | 5/2002 | Berenguel et al. ............ 711/113 |
| 2006/0136667 A1* | 6/2006 | Shultz et al. ................... 711/118 |
| 2006/0174087 A1* | 8/2006 | Hashimoto et al. ........... 711/173 |
| 2007/0106992 A1* | 5/2007 | Kitamura ....................... 718/104 |
| 2012/0005668 A1* | 1/2012 | Serizawa et al. .................. 718/1 |
| 2012/0072685 A1* | 3/2012 | Otani ............................. 711/162 |
| 2012/0102137 A1* | 4/2012 | Pruthi et al. ................... 709/213 |
| 2012/0215970 A1* | 8/2012 | Shats ............................. 711/103 |
| 2012/0304171 A1* | 11/2012 | Joshi et al. ........................ 718/1 |

* cited by examiner

*Primary Examiner* — Abdullah Al Kawsar
(74) *Attorney, Agent, or Firm* — Wilmer Cutler Pickering Hale and Dorr LLP

(57) ABSTRACT

Systems and methods for caching data from a plurality of virtual machines are disclosed. In one particular exemplary embodiment, the systems and methods may be realized as a method for caching data from a plurality of virtual machines. The method may comprise detecting, using a computer processor executing cache management software, initiation of migration of a cached virtual machine from a first virtualization platform to a second virtualization platform, disabling caching for the virtual machine on the first virtualization platform, detecting completion of the migration of the virtual machine to the second virtualization platform, and enabling caching for the virtual machine on the second virtualization platform.

11 Claims, 14 Drawing Sheets

SYSTEM AND METHOD TO CACHE HYPERVISOR DATA

CROSS-REFERENCE TO RELATED APPLICATION

This application claims priority under 35 U.S.C. §119(e) to, and incorporates by reference in its entirety, U.S. Patent Application No. 61/553,619, titled "System and Method to Cache Hypervisor Datastorage" filed on Oct. 31, 2011.

FIELD OF THE DISCLOSURE

Embodiments of this disclosure relate to hypervisor virtual machine computing environments generally, and specifically to caching data for one or more virtual machines.

Background

Memory devices are often used to store data provided by a computer program. Examples of memory storage devices include, but are not limited to, solid-state devices (SSDs), hard disk drives, and optical drives. These types of storage devices are inexpensive and hold large amounts of data. However, one tradeoff for their economic value is that they are slow compared to other components used in a computer. For example, a consumer hard drive can store terabytes of data cheaply, but has a maximum theoretical transfer rate of 300 megabytes (MB) per second. Random access memory (RAM) is faster in performance but higher in price, with a maximum theoretical transfer rate of 12.8 gigabytes (GB) per second. A central processing unit (CPU) with specialized memory known as level 1 (L1) cache or level 2 (L2) cache has even better performance but at an even higher price, with a transfer rate of 16 GB per second, or over fifty times faster than the storage device.

Because computer components exhibit this tradeoff between price and performance, a technique known as caching may be used to increase, or accelerate, overall system performance. Caching may be used to store data requested from one component, into another component, to speed future requests for the same data. The data stored in a cache often may be values previously requested by a software application, by an operating system, or by another hardware component. Caching organizes a small amount of fast-access memory and a large amount of slow-access memory. The first time that a value is requested, the data is not in the cache, so the requested value is retrieved from the slow-access memory. In a cache, when the value is retrieved from the slow-access memory, the value is sent to the component that requested it, and the value also is stored in the fast-access memory for future requests. The next time that the same value is requested by the operating system or by any other program, the value is retrieved from the fast-access memory, with the result that the overall system performance is faster, or accelerated, by virtue of the value being available from the fast-access memory. By using faster memory components to cache data more requests can be served from the cache instead of the slower storage device and the faster overall system performance can be realized.

Computers run operating systems such as MICROSOFT® Windows, MACINTOSH® OS X®, LINUX®, or UNIX®. An operating system manages computer hardware resources and provides common services for execution of various software applications. A virtual machine ("VM") is a software implementation of a computer that runs programs as if it is physical computer hardware. Typically a virtual machine has a completely isolated operating system, called a "guest" operating system, installed and running within a normal host operating system.

A hypervisor is software that allows multiple virtual machines to run concurrently on a single host computer. The name hypervisor is used because the programming runs conceptually one level higher than a "supervisor" program. In Information Technology administration, administrators strive to balance competing goals of finding ways to scale and consolidate their computing infrastructures, while at the same time decreasing the management overhead required to allocate and monitor resources in those infrastructures. One way to address these competing goals is to run multiple virtual machines concurrently using a hypervisor. Hypervisors are generally installed on server hardware whose sole dedicated task is to run virtual machines. "Bare metal" hypervisors run directly on host hardware to control the hardware and to manage guest operating systems. VMWARE®, Inc.'s ESX and ESXi products are examples of bare metal hypervisors.

In the VMWARE® ESX and ESXi products, virtual machines access computer files using a file system known as Virtual Machine File System (VMFS). VMFS provides a file system and storage virtualization optimized for virtual machines. Each virtual machine is allocated its own virtual storage in VMFS. VMFS provides a common mechanism for ensuring data consistency for accessing virtual storage among multiple virtual machines and among multiple hypervisor platforms.

Storage subsystems employed for critical applications employ multiple levels of redundancy to ensure higher availability even when components fail. It is common to configure multiple paths to a storage device. Multi-pathing is when the same storage device can be reached from a host via two routes involving two distinct set of hardware interconnects and bridges. This ensures the data is still accessible when the interconnect or adapter fails.

SUMMARY

Systems and methods for caching data from a plurality of virtual machines are disclosed. In one particular exemplary embodiment, the systems and methods may be realized as a method for caching data from a plurality of virtual machines. The method may comprise detecting, using a computer processor executing cache management software, initiation of migration of a cached virtual machine from a first virtualization platform to a second virtualization platform, disabling caching for the virtual machine on the first virtualization platform, detecting completion of the migration of the virtual machine to the second virtualization platform, and enabling caching for the virtual machine on the second virtualization platform.

In accordance with further aspects of the present disclosure, embodiments for caching data from a plurality of virtual machines may include implementing cache management software on a hypervisor. For example, cache management software can be implemented on a hypervisor as a virtual machine can be exposed to the hypervisor as a storage device.

In one or more embodiments of the present disclosure, detection of the completion of the migration of a virtual machine to a second virtualization platform can be performed using a computer processor executing cache management software. According to some embodiments, at least one of the first virtualization platform and the second virtualization platform can comprise a host. Cache storage of embodiments may comprise a Solid State Device (SSD).

In accordance with further aspects of the present disclosure the systems and methods for caching data may include invalidating, in cache storage, one or more blocks associated with the virtual machine on the first virtualization platform subsequent to the disabling of caching for the virtual machine on the first virtualization platform.

In another exemplary embodiment, the systems and methods for caching data may be realized as a system for caching data from a plurality of virtual machines. The system can comprise cache storage and a computer having a non-transitory computer memory having stored caching instructions stored in the computer memory. The caching instructions may configure the computer to cache data from the plurality of virtual machines. The caching instructions may comprise instructions for detecting initiation of migration of a cached virtual machine from a first virtualization platform to a second virtualization platform, disabling caching for the virtual machine on the first virtualization platform, detecting completion of the migration of the virtual machine to the second virtualization platform, and enabling caching for the virtual machine on the second virtualization platform. According to some embodiments, cache storage on the system may comprise a Solid State Device (SSD).

In accordance with further aspects of the present disclosure, detection of initiation of the migration of the virtual machine utilizing caching is performed by cache management software implemented on a hypervisor. Detection of the completion of the migration of the virtual machine utilizing caching may also be performed by cache management software implemented on a hypervisor in one or more embodiments.

In yet another exemplary embodiment, the systems and methods for caching data may be realized as an article of manufacture for caching data from a plurality of virtual machines. The article of manufacture may comprise at least one non-transitory processor readable storage medium and instructions stored on the at least one medium. The instructions may be configured to be readable from the at least one medium by at least one processor and thereby cause the at least one processor to operate so as to detect initiation of migration of a cached virtual machine from a first virtualization platform to a second virtualization platform, disable caching for the virtual machine on the first virtualization platform, detect completion of the migration of the virtual machine to the second virtualization platform, and enable caching for the virtual machine on the second virtualization platform. According to some embodiments, the instructions may comprise part of cache management software implemented on a hypervisor.

In still another exemplary embodiment, the systems and methods for caching data may be realized as a system for caching data from a plurality of virtual machines. The system may comprise cache storage, a computer having a computer processor and non-transitory computer memory having stored thereon executable caching instructions. The caching instructions may configure the computer to identify a virtual machine of the plurality of virtual machines which is operating, allocate a portion of the cache storage to the virtual machine, and perform caching of data to handle an input/output request of the virtual machine. According to some aspects of such embodiments, the caching instructions may further configure the computer to identify a virtual machine of the plurality of virtual machines which is not operating, and invalidate a portion of the cache storage associated with the virtual machine of the plurality of virtual machines which is not operating.

BRIEF DESCRIPTION OF THE DRAWINGS

So that the features and advantages of the disclosure may be understood in more detail, a more particular description of the disclosure briefly summarized above may be had by reference to the appended drawings, which form a part of this specification. It is to be noted, however, that the drawings illustrate only various embodiments of the disclosure and are therefore not to be considered limiting of the disclosure's scope as it may include other effective embodiments as well.

DETAILED DESCRIPTION

Figure 1A:
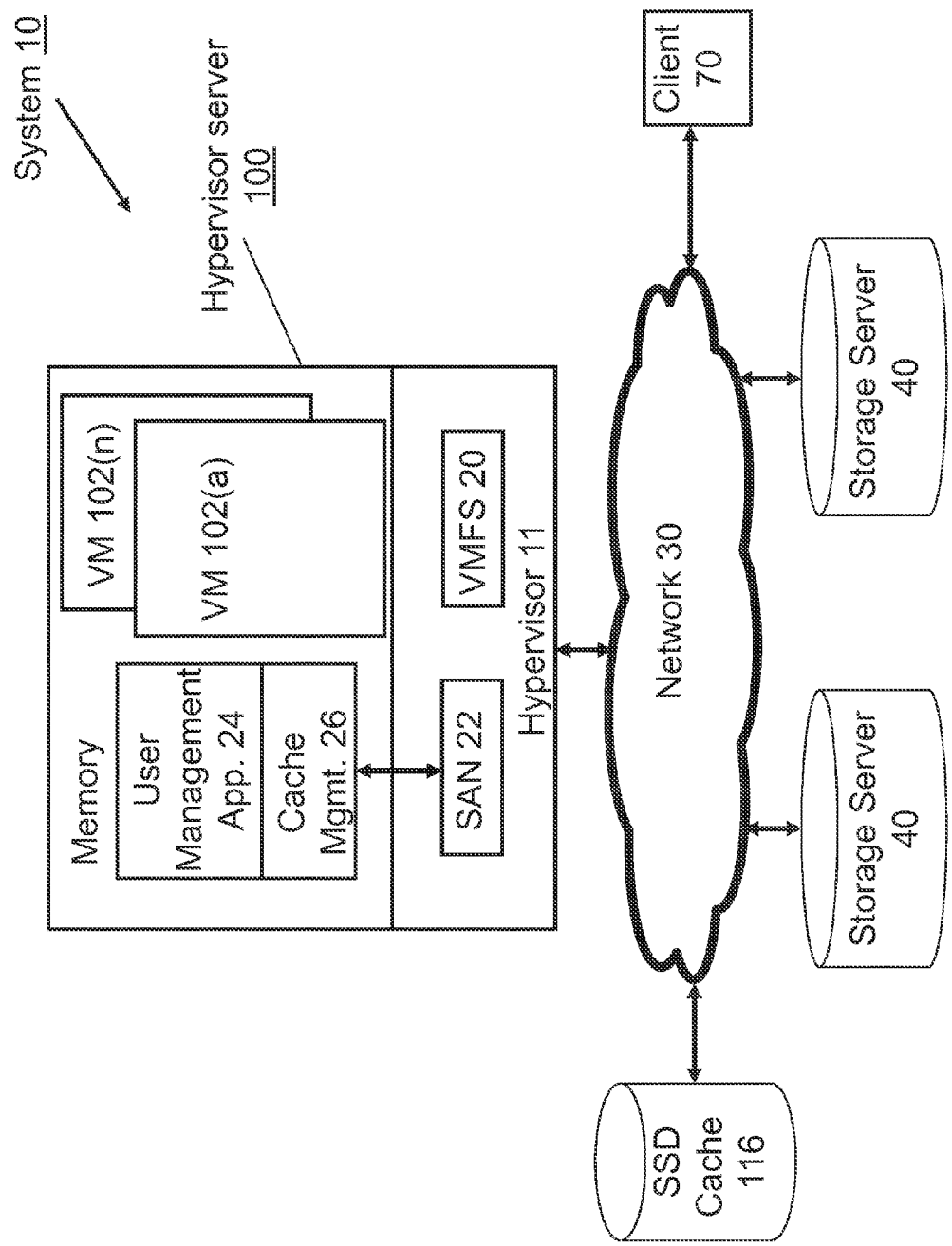
FIG. 1A illustrates a block diagram of a server having a hypervisor and virtual file system stored thereon according to some embodiments of the disclosure.

In general, the present disclosure provides SSD based storage caching for one or more virtual machines. Caching may include caching of a plurality of virtual machines operating on a hypervisor platform. This caching may leverage existing SSD caching software. For example EnhanceIO™ SSD caching software produced by STEC, Inc. or other caching software, for standalone hosts in a virtualized system may be leveraged. Exemplary hypervisors include VMWARE® ESX and VMWARE® ESXi.

According to one or more embodiments of the present disclosure, caching of virtual machine during migration from a first virtualization platform (e.g., a hypervisor on a server) to a second virtualization platform can be managed. The disclosed management of cache during a migration process may improve cache coherence and reduce a risk of stale cache. In some embodiments, cache associated with a VM on a first platform may be disabled prior to migration. Subsequent to migration to a second virtualization platform cache on the second virtualization platform may be associated with the migrated VM and enabled.

One or more embodiments of the present disclosure may improve management of caching by monitoring whether virtual machines are active or not (e.g., shutdown, powered on, halted, etc.) If a virtual machine is active (e.g., powered on and not suspended) a portion of cache may be allocated to the virtual machine and caching for the virtual machine may be performed. If a virtual machine is not active (e.g., shutdown or halted) a portion of cache associated with the inactive virtual machine may be invalidated. This may reduce a risk of stale cache and preserve caching resources.

Hypervisor software may allow a plurality of virtual machines to run concurrently on a single host computer (e.g., by providing virtual computer "hardware" for each virtual machine). Hypervisors may also support virtual machines running different operating systems and/or different virtual hardware. Hypervisors are generally installed on server hardware, but also may be installed as a layer above the server operating system. For example, hypervisors can be of the "bare metal" type and may run directly on host hardware to manage guest operating systems. Hypervisors may also be "hosted" hypervisors that run on a conventional operating system environment. VMWARE®, Inc.'s ESX and ESXi products are examples of bare metal hypervisors, while BHyVe, VMware Workstation and VirtualBox are examples of hosted hypervisors. Some embodiments of the present disclosure may implement a cache of an entire datastore, which may be shared among multiple virtual machines running on a hypervisor platform. Virtual machines can be managed by hypervisor software that can create caching issues (e.g., access problems between the virtual machines and the physical cache). Embodiments of the present disclosure also address these issues.

In the VMWARE® ESX and ESXi hypervisor programs, virtual machines access virtual file storage, a software implementation of physical file storage that links to physically stored computer files (e.g., Virtual Machine File System (VMFS) produced by VMWARE®). Such virtual file systems provide storage virtualization optimized for virtual machines and allow the virtual machine to read a write from disk storage using a common set of protocols and in parallel. In other words, such virtual file systems enable multiple read/writes to disk storage from different operating systems, often at substantially the same time, even though the virtual machines are operating on the same physical computer server. As such, many virtual file systems may allocate each virtual machine its own virtual storage and its own portion of physical disk storage. For example, a hypervisor such as VMWARE® ESX and VMWARE® ESXi may be installed on a server, with an SSD storage device connected to the server to act as a cache for the virtual machines hosted by such platform.

Embodiments of the present disclosure may implement caching by creating an virtual machine (hereinafter VMCache) between a virtual machine file system (VMFS) (e.g., the VMWARE® Virtual Machine File System) and source storage. Solid state devices exhibit better performance characteristics than other storage devices, so faster but smaller solid state devices are good candidates to act as caches for slower but larger storage devices. According to some embodiments, the VMCache virtual machine can be connected to a plurality of SSDs, or other fast medium, such as, for example, but not limited to, phase change memory (PCM), memristor, magnetoresistive random access memory (MRAM), battery backed up memory. Embodiments of the present disclosure may use attached SSDs as caches to improve overall system performance. One or more embodiments of the present disclosure can access SSDs in a VMCache virtual machine via a hardware virtualization interface known as PCI pass-through (Peripheral Component Interconnect pass through).

Moreover, SSD caching software may run on standalone computers to cache storage requests using SSDs. In performance testing on standalone hosts, the SSD caching software resulted in about 2.5 times better throughput than without SSD caching enabled, with response time improving over ten times faster than without SSD caching enabled. The SSD caching software can support about 3.5 times more concurrent users with an average response time of less than two seconds. However, the number of supported users can fluctuate based on current workload.

In some embodiments, data are pre-fetched and cached before being requested by application. One or more embodiments can use applications semantics or AI algorithms to predict what will be the next data that will be accessed and cache it proactively.

Figures accompanying the present disclosure may illustrate a single or multiple components. (e.g., one or more virtual machines, one or more SSDs, and/or one or more interfaces). A person of ordinary skill in the art will appreciate that components may be increased, reduced, combined, separated, or otherwise arranged.

Turning to the figures, as shown in FIG. 1A, embodiments of system 10 of the disclosure include hypervisor server 100. Hypervisor server 100 may include a hypervisor 11, a virtual machine file system ("VMFS") 20, a SAN 22, a user management application 24, a cache management software 26 operating on a kernel of the server, and a plurality of virtual machines ("VMs") 102(*a*)-102(*n*). Embodiments of system 10 may also include a network 30 and a plurality of storage servers 40 (e.g., SSD storage, disk, and/or other electronic storage). System 10 also may include one or more clients 70 which may be communicatively coupled via network 30 to one or more virtual machines. As discussed above, hypervisor server 100 may be implemented on one or more commercially available computer servers. For example, such a server may include an I/O device such as a network card/controller connected by a PCI bus to a motherboard, a computer processor and memory (e.g., any combination of non-volatile memory such as hard disks, flash memory, optical disks, and the like, and volatile memory such as SRAM, DRAM, SDRAM, etc.). Hypervisor software, one or more virtual machines, and virtual file system software may be stored in the memory for use by a server operating system, and one or more of these programs may operate directly on the server hardware or on the operating system of the server.

Hypervisor server 100 may be connected to the plurality of storage devices 40 via network 30. Although network 30 is illustrated as a single network it may be one or more networks. Network 30 may establish a computing cloud (e.g., the software implementing the virtual machines and storage devices are hosted by a cloud provider and exists "in the cloud"). Moreover, network 30 can be a combination of public and/or private networks, which can include any combination of the internet and intranet systems that allow the hypervisor server 100, and a plurality of virtual machines operating thereon, to access storage servers 40; and for client 70 to access the virtual machines. For example, network 30 can connect one or more of the system components using the internet, a local area network ("LAN") such as Ethernet or WI-FI, or wide area network ("WAN") such as LAN to LAN via internet tunneling, or a combination thereof, using electrical cable such as HomePNA or power line communication, optical fiber, or radio waves such as wireless LAN, to transmit data. In this regard, the server and storage devices may use standard internet protocols for communication (e.g., iSCSI). In some embodiments, hypervisor server 100 may be connected to the communications network using a wired connection to the internet.

The communication network may interface with storage servers 40 (e.g., via a firewall) to provide a secure access point for storage devices and clients and to prevent one or more clients 70 from accessing various virtual machines in system 10 without authorization. In some embodiments, a firewall may be a network layer firewall (i.e., packet filters, application level firewalls, or proxy servers). Although in some embodiments a packet filter can block certain source IP addresses, in other embodiments, a packet filter firewall can be used to block traffic from particular source ports, destination IP addresses or ports, or destination service like www or FTP. In other embodiments, an application layer firewall may be used to intercept all packets traveling to or from the system, and may be used to prevent certain users from accessing the system. Still, in other embodiments, a proxy server may act as a firewall by responding to some input packets and blocking other packets.

Returning to FIG. 1A, storage servers 40 communicate with and upload data to the hypervisor server 100 via the network 30. As such, storage servers 40 may be, for example, slow-access storage or fast access storage comprising one or more computers, file servers or database servers. Storage servers 40 may be implemented as network attached storage ("NAS"), storage area networks ("SAN"), direct access storage ("DAS"), multiple hard disk drives, SSDs, or any combination thereof.

As mentioned above, in addition to storage servers 40, embodiments also may include one or more SSD cache 116, which may implement SSD-based storage caching for a hypervisor platform operating on the server. To do this, embodiments of the disclosure may leverage existing SSD caching software such as EnhanceIO or other caching software for standalone hosts. For example, a hypervisor such as VMWARE® ESX and VMWARE® ESXi may be installed on hypervisor server 100, with an SSD storage device connected to the hypervisor server 100 providing a cache for the virtual machines hosted by such platforms. Caching may be achieved by creating a virtual machine (hereinafter "VMCache") between the virtual file system, e.g., VMWARE® Virtual Machine File System ("VMFS"), and physical storage for the virtual machines.

Figure 1B:
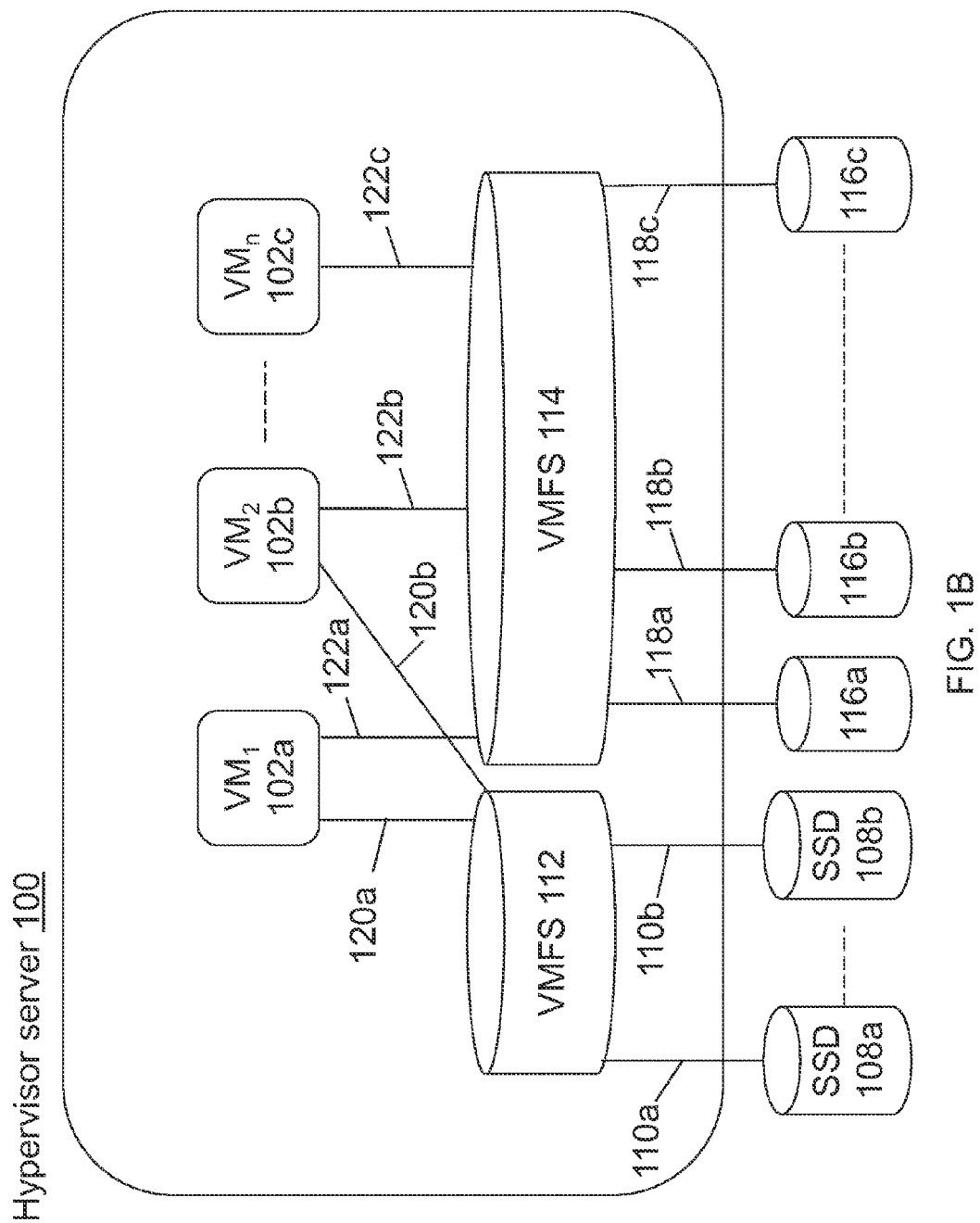
FIG. 1B illustrates a block diagram of a system for hypervisor caching by allocating SSDs to individual virtual machines according to some embodiments of the disclosure.

FIG. 1A is a description of a network or cloud-based implementation of an embodiment of the present disclosure. However, implementations not using a cloud are also possible. FIG. 1B illustrates a block diagram of a system for caching data of one or more virtual machines by allocating one or more SSDs to the one or more virtual machines. FIG. 1B includes a hypervisor server 100; virtual machines (VMs) 102a-n; interfaces 120a-b, 122a-n; VMFS 112 with storage 108a-b and interfaces 110a-b; and VMFS 114 with storage 116a-c and interfaces 118a-c.

The hypervisor server 100 may include one or more virtual machines such as, for example, VMs 102a, 102b, and 102c. VMs 102 may use VMFS 112 and VMFS 114 via interfaces 120a, 120b, 122a, 122b, and 122c to access files stored on SSDs 108a, 108b and on storage 116a, 116b, 116c. VM 102a may use interface 120a and VM 102b may use interface 120b to access VMFS 112. VMs 102a, 102b, and 102c may use interfaces 122a, 122b, 122c, respectively to access VMFS 114. As illustrated in FIG. 1B, VMFS 112 may be an independent VMFS datastore using only SSDs 108a and 108b over interfaces 110a and 110b. VMFS 112 may perform faster than VMFS 114 because storage 116a-116c may perform reads and writes slower than SSDs 108a-108b. An administrator may configure VMFS datastore 114 to access storage 116a-116c over interfaces 118a-118c. The administrator may configure the standalone SSD caching software on one or more of VMs 102a-102b using information about desired virtual machines and storage to cache. For example, if the administrator configures VM 102a to utilize SSD 108a, the administrator may configure the SSD caching software on VM 102a with information about SSD 108a, VM 102a, VMFS 112, and VMFS 114. Accordingly, the SSD caching software configuration on VM 102a may send read file requests and write file requests to the faster VMFS 112, rather than have the slower VMFS 114 respond to the requests.

Although the direct-SSD system illustrated in FIG. 1B may be implemented, the system may have a few limitations. For example, an administrator may configure SSD caching software separately for each VM 102 to utilize the speed advantages of SSDs 108a-108b. Accordingly, a direct-SSD system may not scale when the administrator must configure tens or hundreds of virtual machines. Furthermore, for each VM 102 to be cached, an administrator may perform multiple steps for each VM 102. In particular, using the direct-SSD system illustrated in FIG. 1B, the administrator may: (1) provision an SSD 108 and configure the VMs 102 to use SSD 108, and (2) manage the standalone caching software in each VM 102. Furthermore, using dedicated SSDs may provide poor utilization of the SSD when other VMs are idle. The direct-SSD system illustrated in FIG. 1B may allocate an SSD for use by a VM 102 configured with the standalone caching software. Accordingly, when using the direct-SSD system illustrated in FIG. 1B configured as described above, an allocated SSD may become unavailable for use by other VMs.

Figure 2:
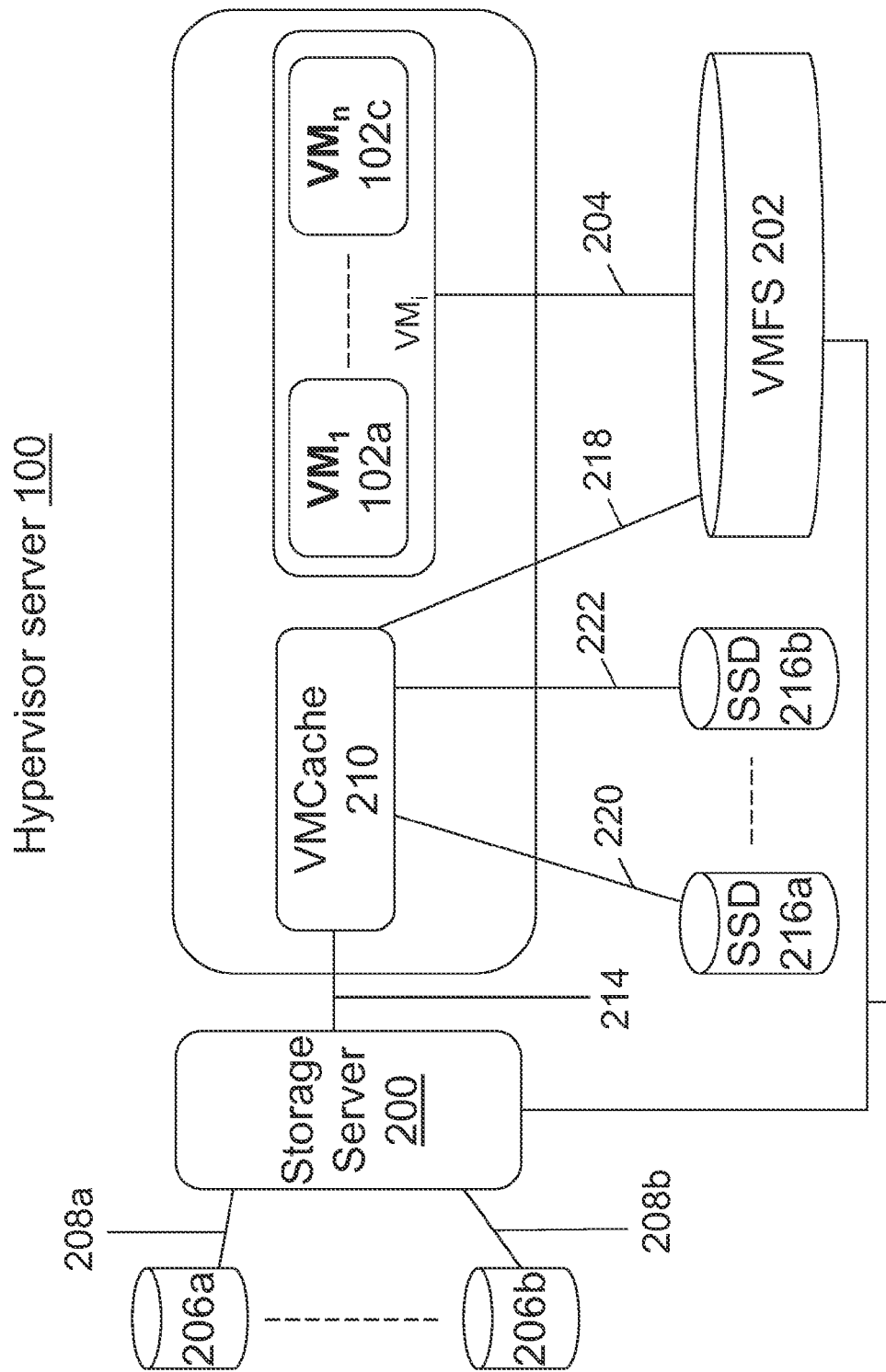
FIG. 2 illustrates a block diagram of another system for hypervisor caching using a virtual machine according to some embodiments of the disclosure.

FIG. 2 illustrates a block diagram of another system for hypervisor caching using a virtual machine, e.g., a VMCache, in accordance with the present disclosure. FIG. 2 includes a hypervisor server 100, the virtual machines ("VMs") 102a-102c, and a storage server 200 connected to logical unit numbers (LUNs) 206a-b over interfaces 208a-b. FIG. 2 further includes a VMCache 210 connected to the storage server through interface 214, and connected to SSDs 216a-b. A Virtual Machine File System ("VMFS") 202 is connected to the VMCache 210 over interface 218, and connected to the VMs 102a-102c over interface 204. The disclosed embodiments also are applicable when the storage subsystem used is a fiber channel protocol for the SAN storage in place of an iSCSI protocol for the SAN storage, and any type of protocol that may be appropriate to communicate with a remote storage device should be considered within the scope of the disclosure.

As illustrated in FIG. 2, with reference to FIGS. 1A and 1B, an administrator may configure an underlying logical unit number (LUN) data store on a storage server 200 (e.g., connected to the hypervisor server 100 using iSCSI communications protocols). The term Logical Unit Number (LUN) may, for example, refer to a logical or virtual disk and may be created and configured on a Storage Area Network (SAN). A LUN may be similar to hard disk storage as configured on a personal computer such as a desktop or notebook computer. The term iSCSI stands for Internet Small Computer System Interface (iSCSI), which is an Internet-Protocol-based storage networking standard for using LUNs. As illustrated in FIG. 2, storage server 200 may read data from and write data to LUNs 206a-206b using interfaces 208a-208b. Read and write operations may be slower when handled by the LUNs 206a-206b, than if the same read and write operations are handled by the SSDs 216a-216b.

In another embodiment, a virtual machine 210 (hereinafter VMCache 210) is created on hypervisor server 100. The VMCache 210 is separate from the VMs 102a-102c. The VMCache 210 may act as an intermediary between VMFS 202 and the underlying LUNs 206a-206b attached to the storage server 200 via interfaces 208a-208b. The VMCache 210 may use a hardware virtualization interface for a device mapping to pass commands and data to and from the SSDs 216a-216b. Exemplary device mappings include configuring the system for raw device mapping (RDM) and/or configuring the system for PCI pass-through. An administrator may create and configures the VMCache 210 on the hypervisor server 100 in software using similar techniques to those used to create and configure the host VMs 102a-102c. The administrator may further configure the VMCache 210 with the software to use SSDs 216a-216b via interfaces 220 and 222 for caching read and write requests from the VMs 102a-102c. In this way, the VMCache 210 runs as an intermediary between the storage server 200 using the underlying LUNs 206a-206b, and the VMFS 202 used by the VMs 102a-102c. Accordingly, read and write file requests which can be serviced from the faster but smaller SSDs 216a-216b attached to the VMCache 210 do not propagate back to the slower but larger LUNs 206a-206b, as described in further detail below.

Embodiments of the disclosure, in addition to providing acceleration, also address reliability by configuring a VMCache data path 218 as an additional redundant data path. The existing path (219) from VMFS (202) to iSCSI server (200) may be lowered in priority to allow all data to pass through the caching engine. This configuration has two advantages. First, a cache enable operation can be a live operation. Specifically, the datastore being cached can contain virtual machine files which are currently running Because at each point in time there is always a consistent datapath to the storage, virtual machines on the datastore being cached need not be shutdown. Second, if SSD caching software or VMCache were to crash, this failure would not result in an outage of any cached virtual machine. Data would continue to propagate from the alternately configured path and would prevent such an outage.

Figure 3:
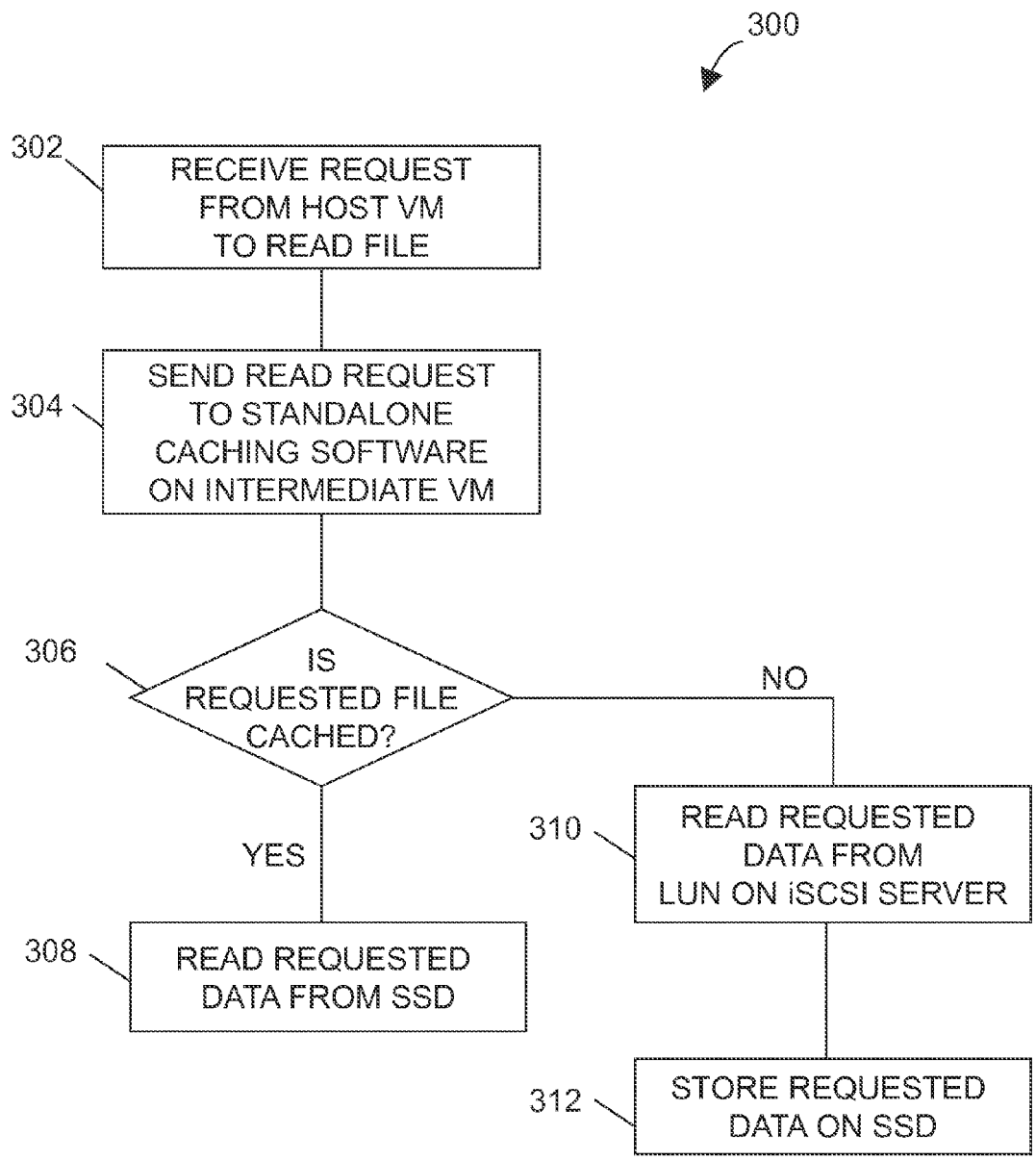
FIG. 3 illustrates a flow diagram of a method for responding to read requests in a system for hypervisor caching using a virtual machine according to some embodiments of the disclosure.

Providing SSD-based storage caching to hypervisor platforms increases overall system performance of read and write file requests. FIG. 3 illustrates a flow diagram of a process 300 for responding to read requests in a system for hypervisor caching using a virtual machine. FIG. 3 will be described herein with reference to FIGS. 1A, 1B, and 2. When a host virtual machine 102a-102c makes a system call to the VMFS 202 to read data, the present method does not propagate read requests serviced from the SSDs 216a-216b attached to the VMCache 210 back to the underlying LUNs 206a-206b. The VMCache 210 may be implemented on a virtual machine between a host VM and one or more LUNs. The VMCache 210 may receive a read request from a host VM 102a-102c (step 302). The VMCache 210 sends the read request to caching software, such as the SSD caching software, running on the VMCache 210 (step 304). The caching software checks whether the requested data block is cached (step 306). If the requested data block is not cached, the caching software reads the requested data from LUNs 206a-206b on the storage server 200 (step 310) and the caching software writes the requested data to the SSD 216a-216b (e.g., using an optional device mapping) (step 312). On the other hand, if the requested file is cached, the caching software reads the requested data block from the SSDs 216a-216b (e.g., using an optional device mapping) (step 308). In this event, the caching software does not propagate the read request to the LUNs 206a-206b, and instead reads the requested data block from the SSDs 216a-216b. The lack of propagation to the LUNs 206a-206b improves overall system performance because the VMCache 210 can provide the requested data from faster SSDs 216a-216b, saving the present system from having to wait for slower LUNs 206a-206b to read the requested data block.

Figure 4:
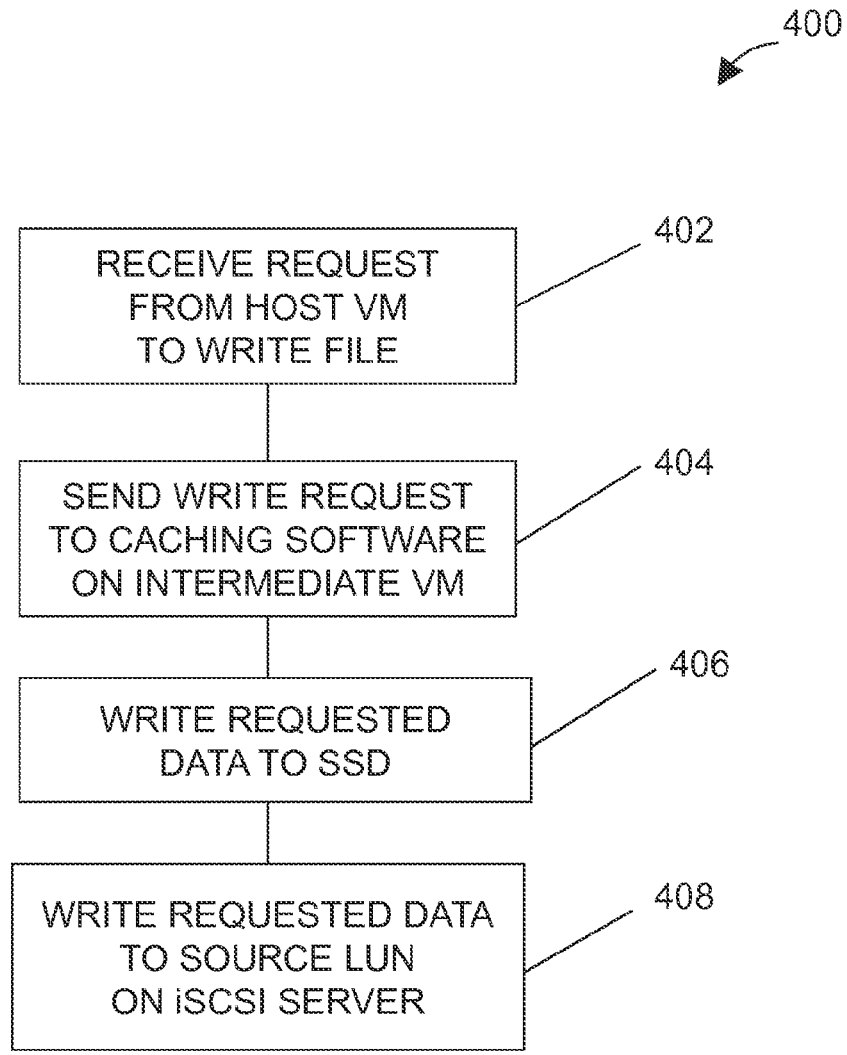
FIG. 4 illustrates a flow diagram of a method for responding to write requests in a system for hypervisor caching using a virtual machine according to some embodiments of the present disclosure.

FIG. 4 illustrates a flow diagram of a process 400 for responding to write requests in a system for hypervisor caching using a virtual machine in accordance with embodiments of the present disclosure. FIG. 4 will be described herein with reference to FIGS. 1A, 1B, and 2. The VMCache 210 may respond to write requests in a manner similar to responses to read requests. For example, when a VM 102a-102c makes a system call to VMFS 202 to write data to the VMFS 202, embodiments of the present disclosure track and store write requests in the faster SSDs 216a-216b underlying the VMCache 210, and the write operations may later be propagated to the slower LUNs 206a-206b depending on a write policy. The VMCache 210 receives a write request from a host VM 102a-102c to write data to a file (step 402). The VMCache 210 sends a write request to the caching software on the VMCache 210 (step 404). The caching software on VMCache 210 writes the requested data to the SSD 216a-216b (step 406). The caching software writes the data to the source LUN 206a-206b corresponding to the file using storage server 200 and interface 214 (step 408). Accordingly, the SSD 216a, 216b is able to provide this cached data if the caching software receives a subsequent read request for the same data. According to some embodiments this may be implemented using "write-through" caching wherein the VMCache 210 writes the data to the SSD 216a-216b (step 406), and synchronously also writes the data "through" the SSD to the source LUN 206a-206b (step 408). According to some embodiments, this may be implemented using write-back caching or write-behind caching, wherein writing is performed first to the cache (e.g., SSDs) and later the source (e.g., LUNs 206a-206b).

Embodiments of virtual machine caching described herein provide faster reads and writes and also provide improved ease of administration by reducing the number of modules which require configuration changes. Unlike the direct-SSD caching system illustrated in FIG. 1A, embodiments of the virtual machine system illustrated in FIGS. 2-4 do not require configuration changes in guest operating systems running on the VMs 102a-102c. Using embodiments of the virtual machine system illustrated in FIGS. 2-4, the administrator does not configure host VMs 102a-102c to use caching. Instead, embodiments of the present system can provide a single point of management for an administrator, who can configure only the VMCache 210 as described above.

Embodiments of the virtual machine caching described herein also improve storage usage when used in Copy-On-Write applications. A common use for hypervisor systems includes using multiple virtual machines to represent a single base configuration of a guest operating system, and using each virtual machine to contain incremental configuration changes to the base configuration from one virtual machine to another. Copy-On-Write refers to a feature whereby a VMFS may store incremental configuration changes in a space-efficient manner by storing a base configuration, and deferring space-intensive copying of the base configuration to new storage until a host virtual machine requires writing of incremental changes. Because virtual machine caching may operate against the entire data store including the storage server 200 and the LUNs 206a-206b, the virtual machine system caches mainly incremental changes, which may represent a more efficient use of SSD storage space. In contrast, in a direct-SSD caching system as illustrated in FIG. 1A, caching software running on a host VM 102a-102c may repeatedly cache copies of the same base configuration, which may represent an inefficient use of storage space on SSDs 108a-108b.

Figure 5A:
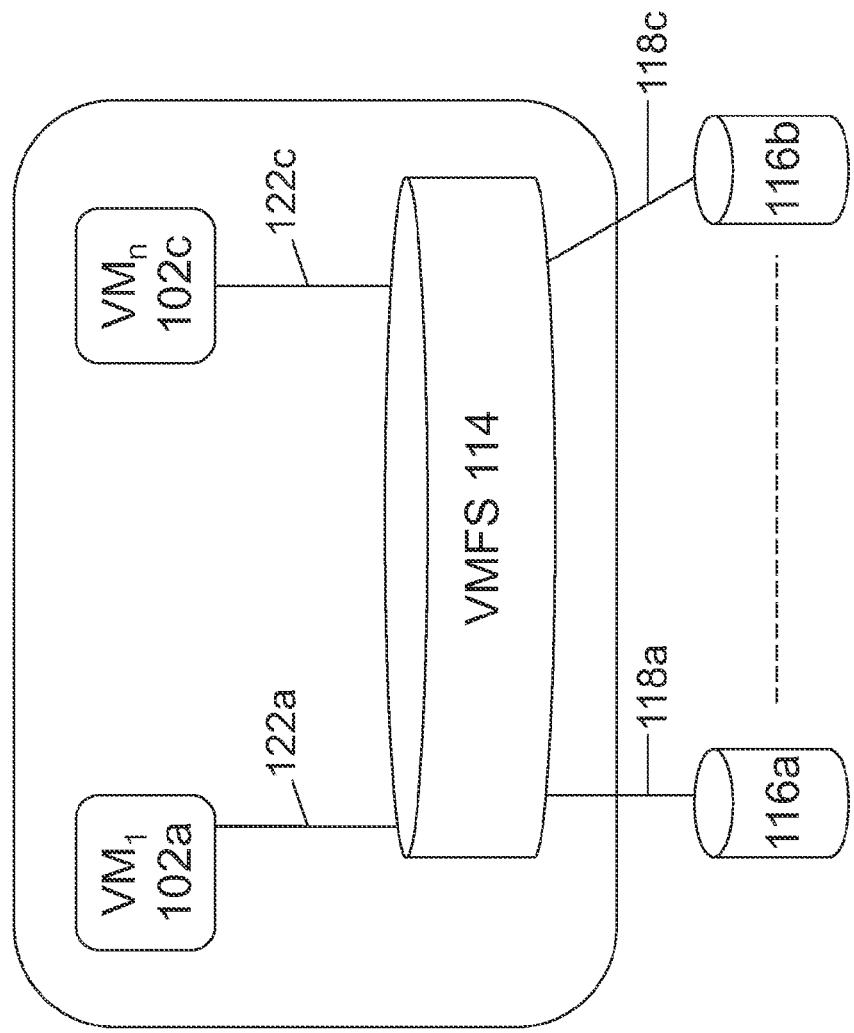
FIG. 5A illustrates an existing hypervisor deployment to be migrated to a deployment using a cache according to some embodiments of the present disclosure.

The virtual machine caching also improves administration when used in migration applications for existing hypervisor deployments. FIG. 5A illustrates an existing hypervisor deployment to be migrated using embodiments of the present disclosure. FIG. 5A includes a hypervisor server 100, and the VMs 102a-102c having the interfaces 122a-122c to the VMFS 114 configured to use slower storage 116a-116b over the interfaces 118a-118c. FIG. 5A illustrates, with reference to FIG. 1B, a migration scenario, whereby an administrator may adapt an existing hypervisor system deployment to use the virtual machine caching described above. In existing hypervisor deployments such as hypervisor server 100, an administrator may have previously configured VMs 102a-102c to use the VMFS 114 over the interfaces 122a-122c. The administrator also may have previously configured the VMFS 114 to use the existing storage 116a-116b.

Figure 5B:
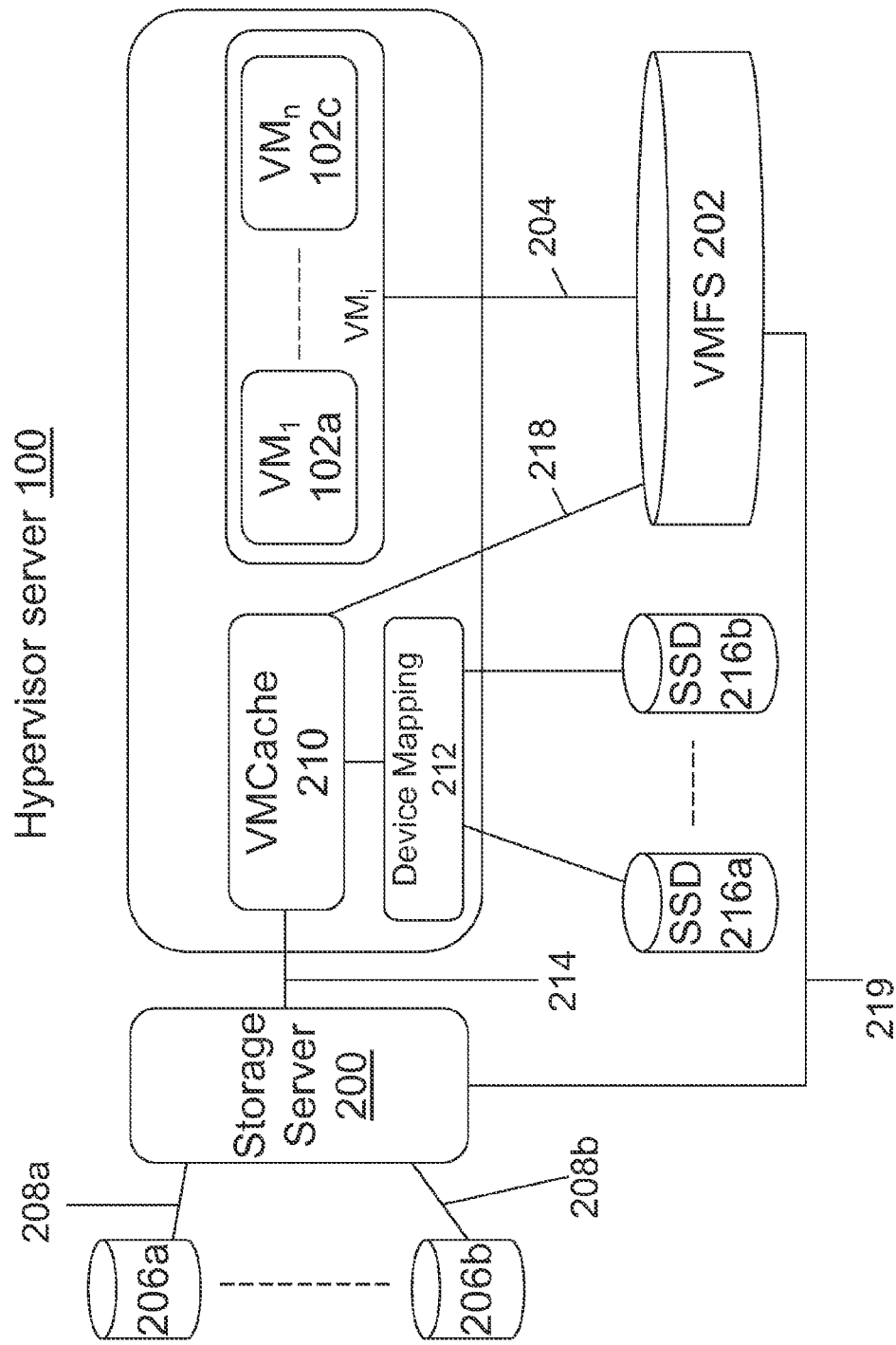
FIG. 5B illustrates a migrated hypervisor deployment, with a cache, according to some embodiments of the present disclosure.

FIG. 5B illustrates a migrated hypervisor deployment using the present system and method. FIG. 5B includes the hypervisor server 100; the VMs 102a-102c reconfigured to use the Virtual Machine File System (VMFS) 202 with the interfaces 204-218; the VMCache 210 with the optional device mapping 212 and the solid state devices (SSDs) 216a-b; and the storage server 200 configured with the storage 206a, 206b using interfaces 208a-b. FIG. 5B shows, with reference to FIGS. 1A, 1B, and 2, the result of migrating an existing hypervisor system deployment using the present virtual machine caching. To migrate existing hypervisor deployments, an administrator may reconfigure VMs 102a-102c as follows. Instead of using VMFS 114 with existing storage 116a-116c as illustrated in FIG. 5A, an administrator can reconfigure VMs 102a-102c to use VMFS 202 over interface 204. As illustrated in FIG. 5B, an administrator can configure VMFS 202 to use the VMCache 210 over interface 218 with the SSDs 216a-216b over the optional device mapping 212. The administrator can configures the storage server 200 to use the existing storage 206a-206b over interfaces 208a-208b. Accordingly, embodiments of the disclosure allow an administrator to use a VMCache 210 to migrate existing hypervisor deployments so that existing VMs 102a-102c gain the benefit of the present virtual machine caching using existing storage 216a-216b, simply by changing the VMFS configuration of the existing VMs 102a-102c.

Additionally, virtual machine caching can improve cache use efficiency when host virtual machines are shut down. Virtual machine caching stores active data from virtual machines and reduces a risk of cached data getting stale by reducing caching of inactive machines. In a virtual machine system, such as those illustrated in FIGS. 2-4, if an administrator shuts down a VM 102a-102c, then the caching software on the VMCache 210 would slowly stop caching data related to one or more inactive VMs of VMs 102a-102c. Accordingly, the virtual machine system may cache new data from one or more active VMs of VMs 102a-102c. For example, if VM 102a is inactive caching of that virtual machine may be disabled. However, if VM 102b and VM 102c are active they may be cached. In contrast, in a direct-SSD caching system as illustrated in FIG. 1A, an underlying SSD 216a-216b would be allocated to any inactive VMs of VMs 102a-102c. As a result an underlying SSD 216a-216b may end up underutilized.

Figure 6A:
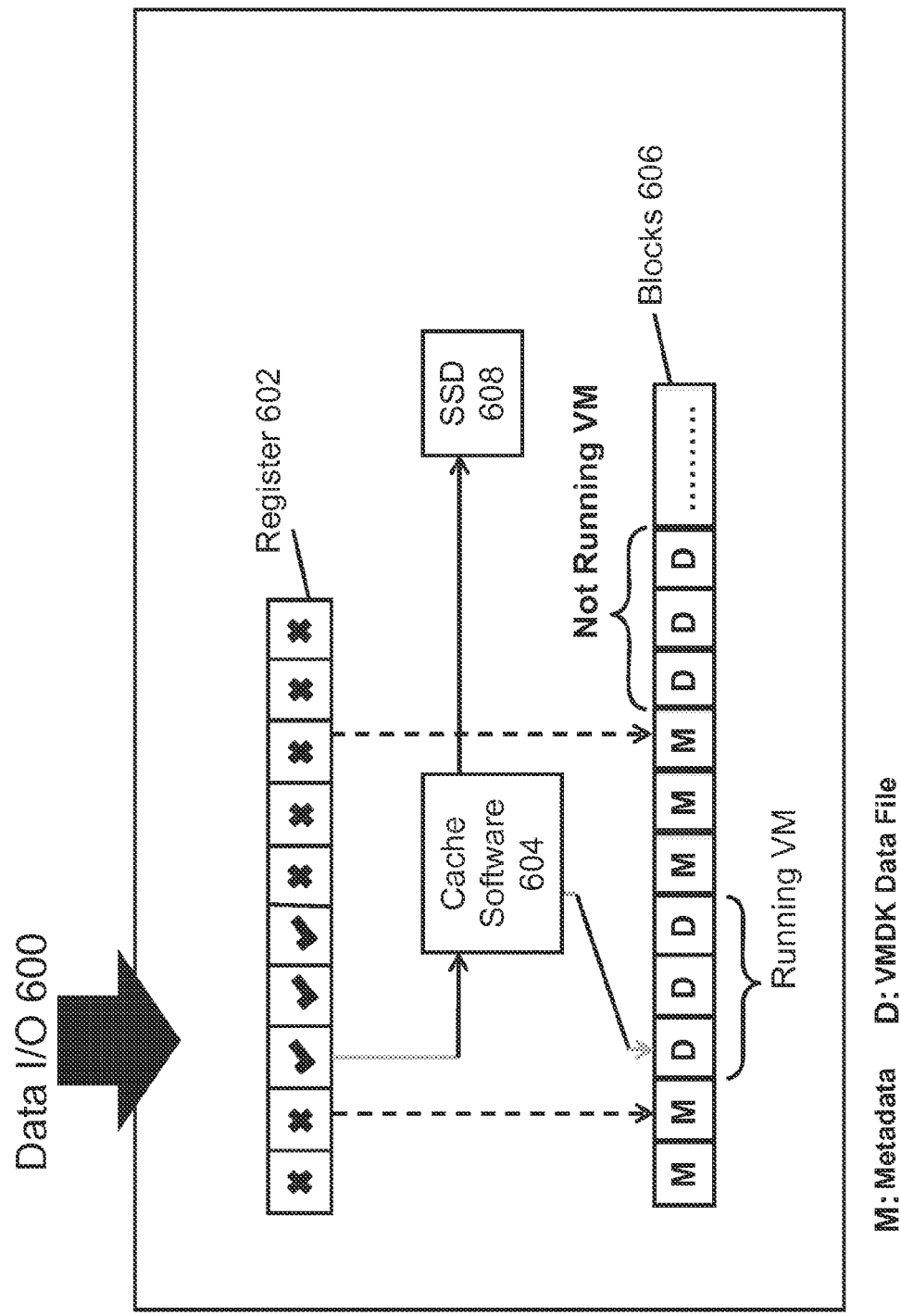
FIG. 6A is a block diagram of cache storage for operating virtual machines that are in operation according to an some embodiments of the present disclosure.
Figure 6B:
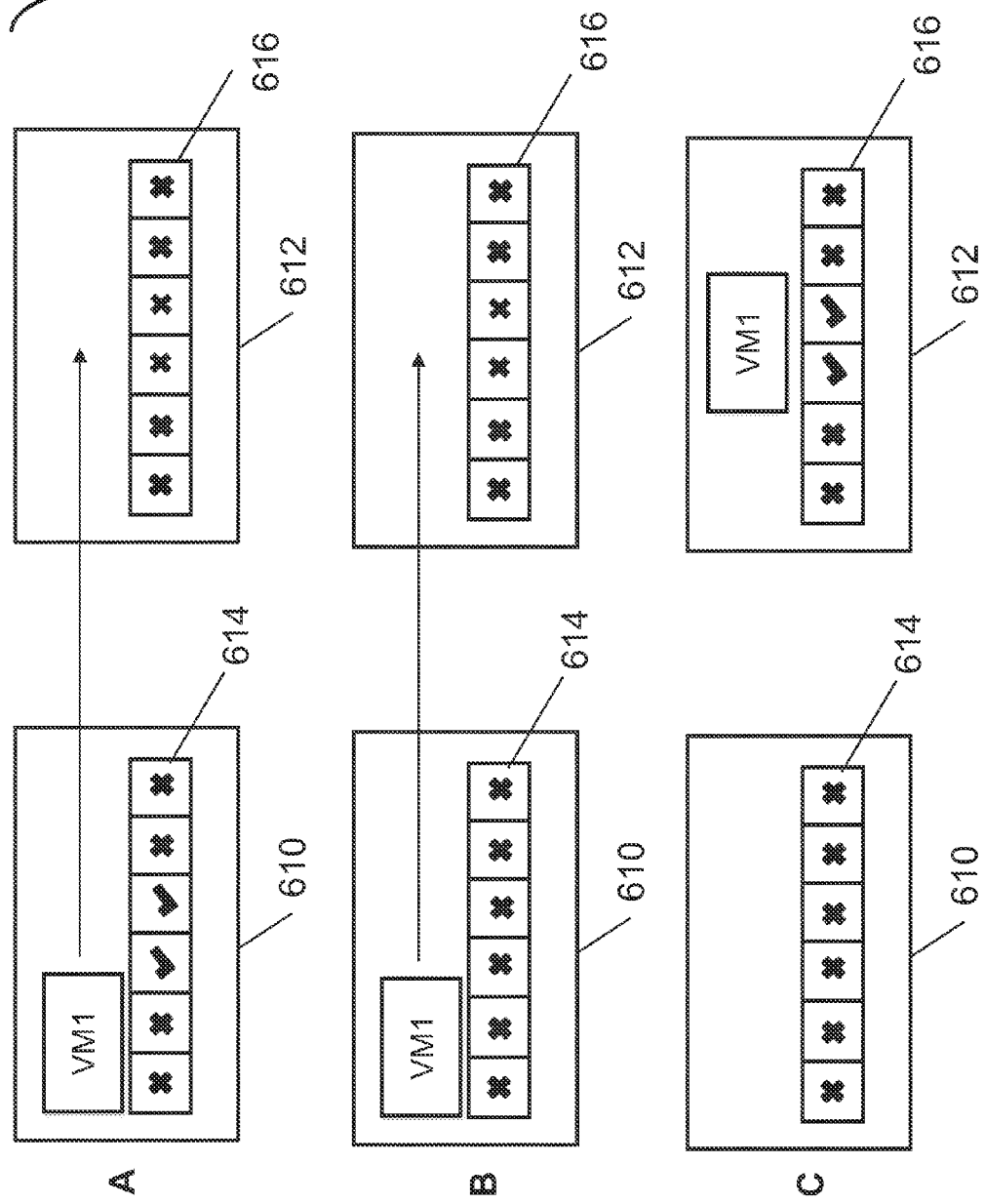
FIG. 6B is a block diagram of a virtual machine migration and change in cache storage according to some embodiments of the present disclosure.

Turning to FIGS. 6A and 6B, embodiments of the disclosure may include a cache coherence algorithm, e.g., a method for managing the cache of virtual machines based upon whether or not a virtual machine is in operation. To do this, embodiments of the disclosure determine whether or not data I/O 600 is being received by a virtual machine from the storage server, e.g., it appears in register 602 (e.g., a bitmap). If data I/O 600 is received from the storage server, the VMcache software 604 writes the data into blocks 606 in the SSDs 608, for example, at the front of cache memory. Data that has been cached by virtual machines that are not operating is pushed to the bottom of cache memory to be written over if enough virtual machines are using the cache. In this way, cache storage for a virtual machine is disabled when the machine is powered off or otherwise inactive. Moreover, cache coherence operations, as described above, may also be performed when a virtual machine is migrated to another server.

As shown in FIG. 6B, virtual machine 1 (VM 1) may be moved from hypervisor server 610 to hypervisor server 612, thereby requiring cache storage to migrate as well. To do this, embodiments may invalidate cache storage for the VM 1 operating on hypervisor 610 and connect the cache storage to the VM 1 once it is running on hypervisor server 612. In step A, the process starts with the VM 1 operating on hypervisor server 610 and having cache storage associated therewith, and hypervisor server 612 having no associated cache storage. As illustrated cache 614 has two exemplary checks representing allocated cache and several X's representing unallocated cache. Cache 616 of hypervisor 612 has no allocated cache blocks (i.e., all cache blocks are represented with x's). In step B, the cache storage associated with the VM 1 on hypervisor server 610 is disconnected, and neither hypervisor server 610 nor hypervisor server 612 have associated cache storage for VM 1. In step C, the VM 1 is migrated to hypervisor server 612 and a portion of cache 616 is connected thereto. Note that hypervisor server 610 no longer is managing cache storage for VM 1.

Figure 6C:
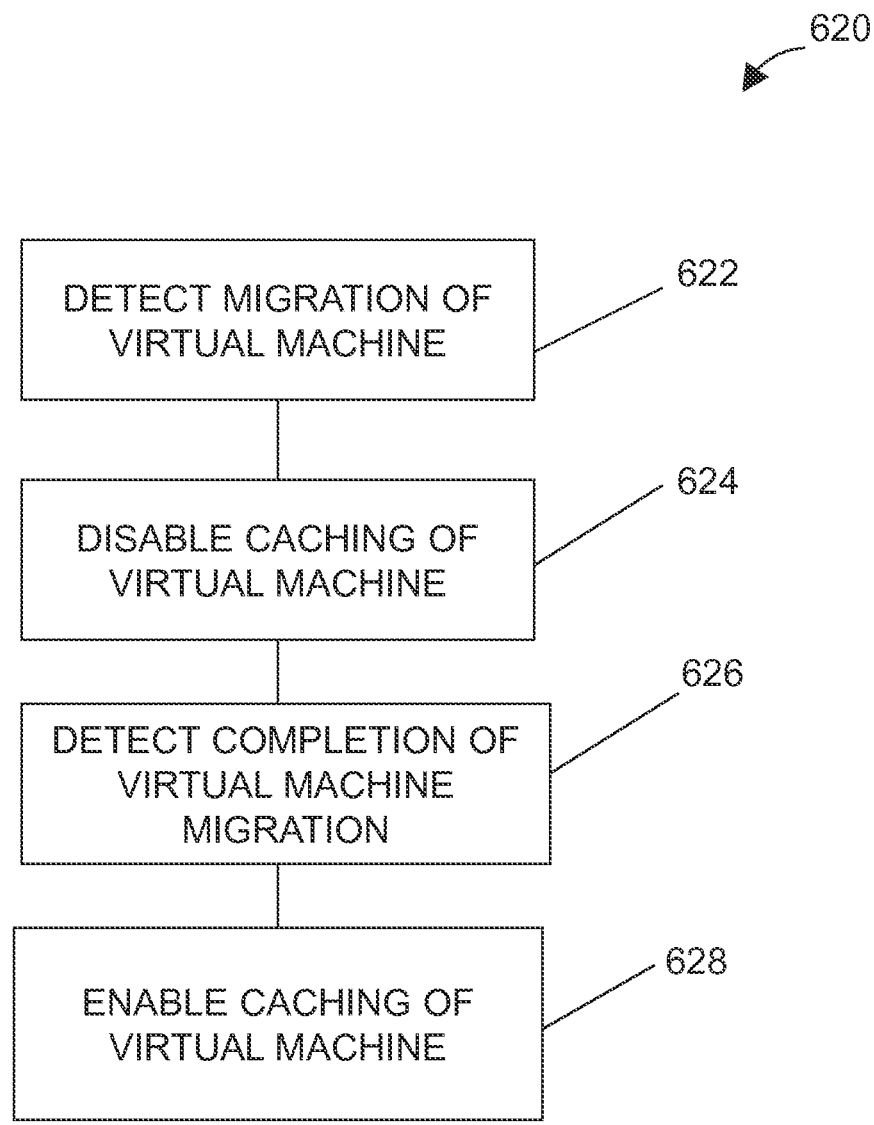
FIG. 6C illustrates a flow diagram of a method for managing caching of a virtual machine during migration according to some embodiments of the present disclosure.

FIG. 6C illustrates a flow diagram of a method 620 for managing caching of a virtual machine during migration according to some embodiments of the present disclosure. At step 622 migration of a virtual machine may be detected. For example, cache management software may determine that migration of VM1 of FIG. 6B has been initiated. Caching may be disabled for a virtual machine determined to be migrating (e.g., from hypervisor server 610 to hypervisor server 612) at step 624. At step 626 completion of the virtual machine migration may be detected (e.g., by cache management software). At step 628 caching of the virtual machine may be enabled on a new virtualization platform (e.g., caching of VM1 on hypervisor server 612 may be enabled).

Figure 7A:
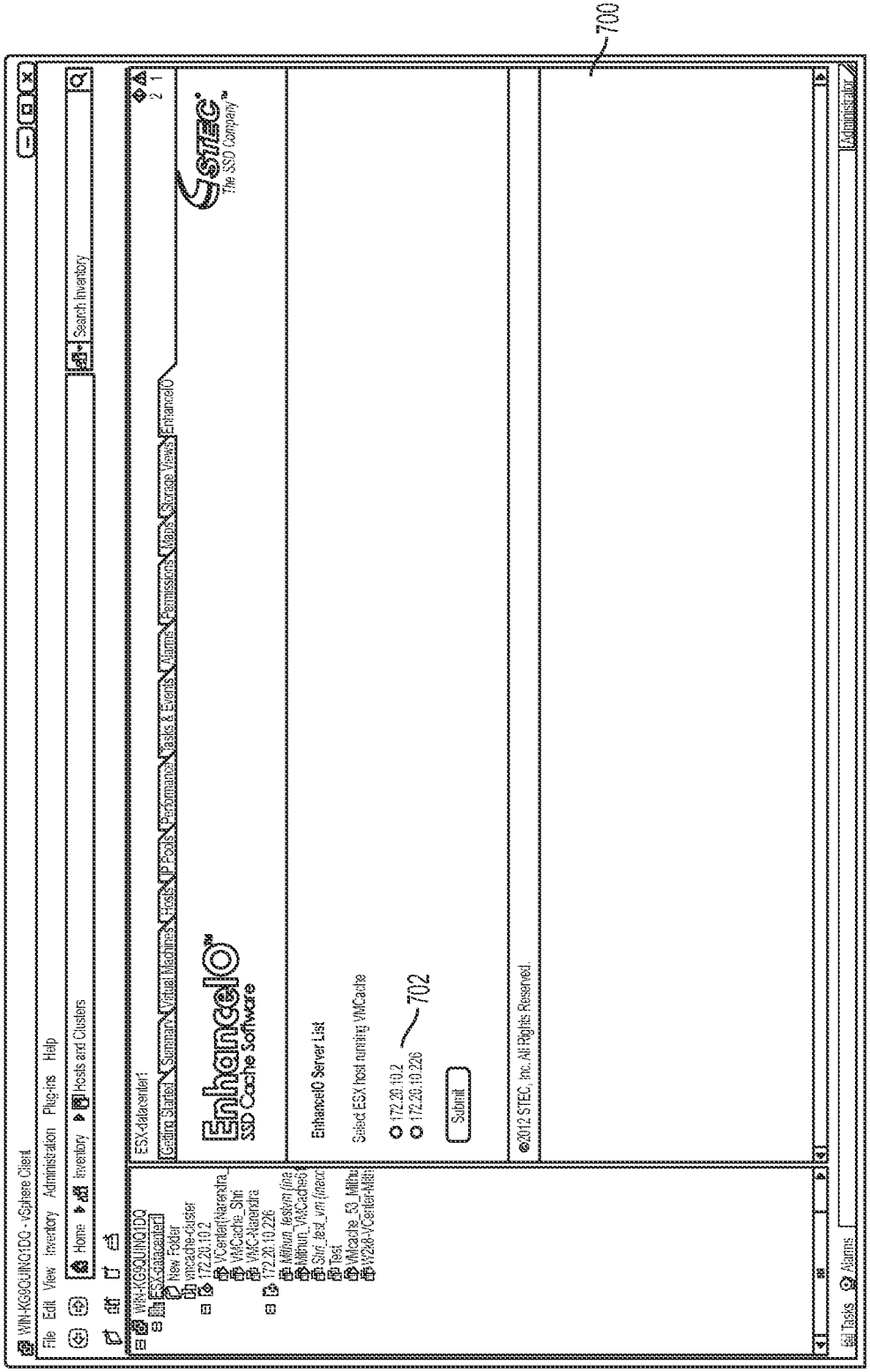
FIG. 7A is a graphical user interface ("GUI") showing deployment options for implementing a cache for a plurality of virtual machines according to some embodiments of the present disclosure.
Figure 7B:
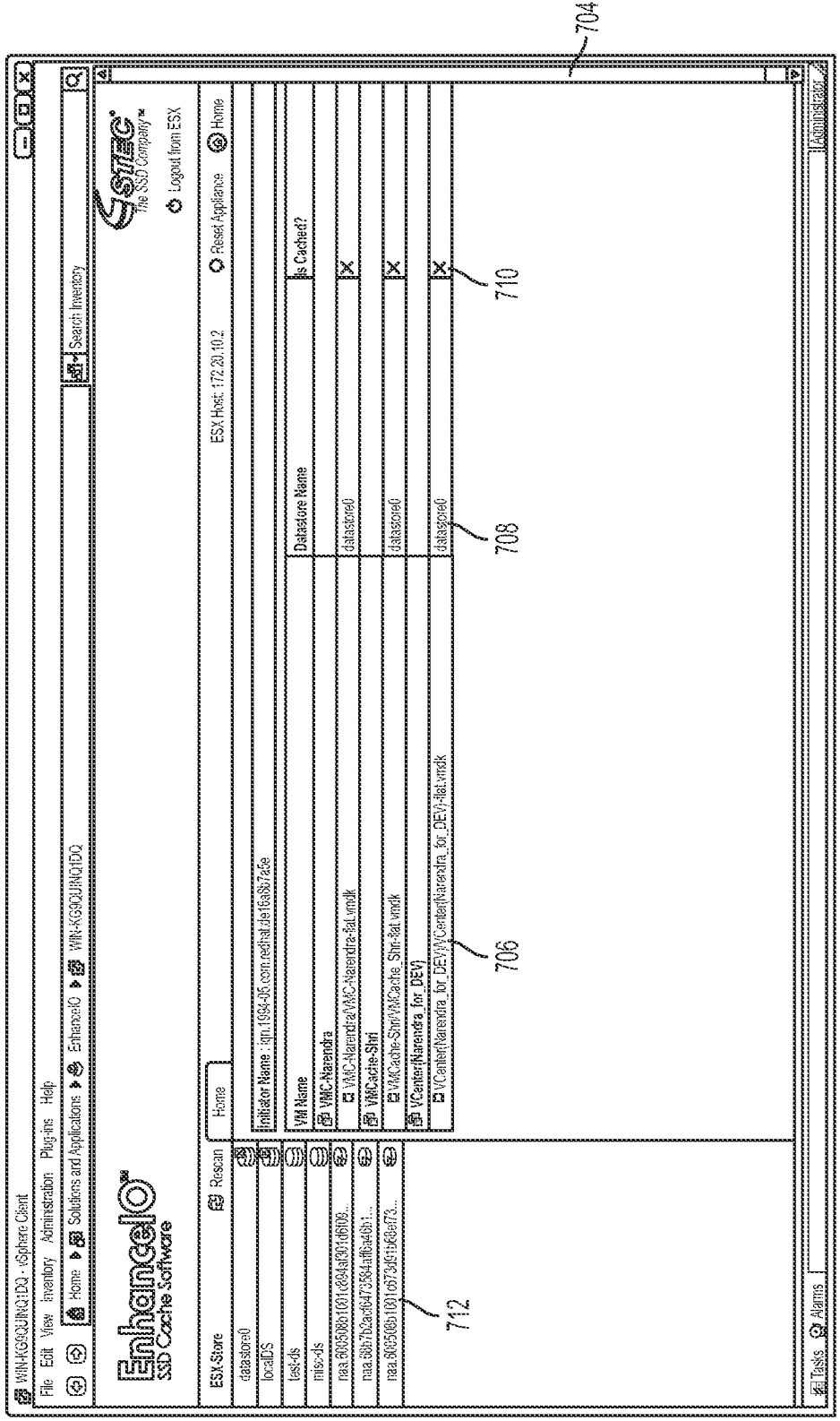
FIG. 7B is another GUI showing deployment options for implementing a cache for a plurality of virtual machines according to some embodiments of the present disclosure.
Figure 7C:
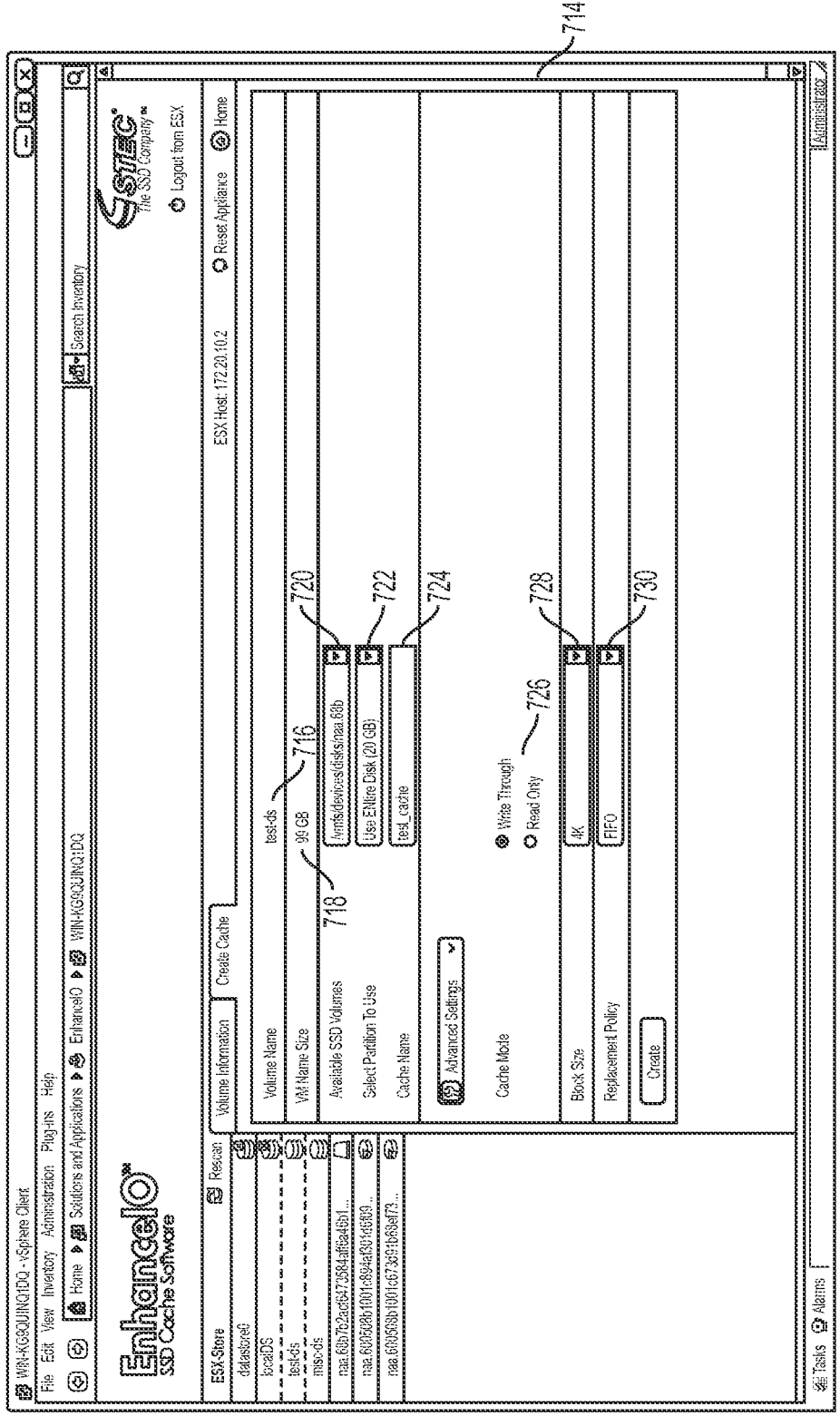
FIG. 7C is a GUI showing deployment options for implementing a cache for a plurality of virtual machines according to some embodiments of the present disclosure.
Figure 7D:
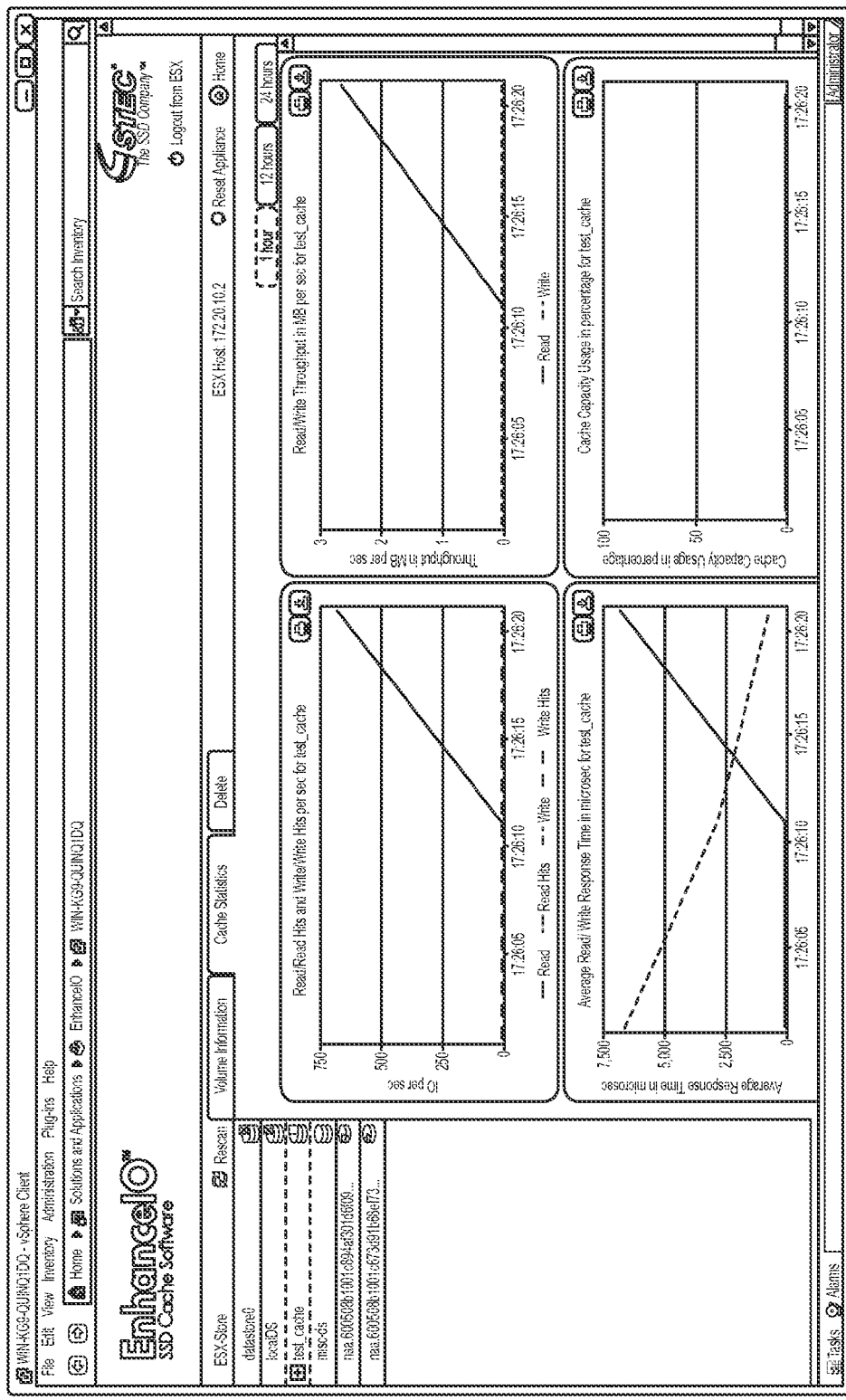
FIG. 7D is another GUI showing deployment options for implementing a cache for a plurality of virtual machines according to some embodiments of the present disclosure.

To deploy the VMcache software in embodiments of the disclosure, the following steps may be followed: a connection between the virtual machine that is operating and the cache storage device may be established; the virtual machine is enabled to utilize the cache storage device as a cache; an alternate input-output path between the virtual machine that is operating and the hypervisor is created; and the original path from which the storage is accessed is removed. These process steps are more readily ascertained from graphical user interfaces (GUIs) of FIGS. 7A-7D. As can be seen in FIG. 7A, the Enhance IO™ screen 700 from the data center for a virtual machine allows for the selection of a virtual host 702 running VMCache, e.g., a hypervisor such as ESX. Once the host is selected, the user is presented with the host screen 704 in FIG. 7B. As can be seen, the virtual machines 706 running on the host are presented to the user along with the datastore 708 the virtual machines are accessing. An indicator 710 indicates whether or not the virtual machine in the list is cached. In addition, a list of datastores 712 available to the host is presented to the user in a column. If the user selects a datastore from the list of datastores 712, the datastore screen 714 in FIG. 7C is presented to the user. Here, the user can select the name of the datastore 716, the size of the datastore 718, the available SSD volumes 720, the partition to use for a particular virtual machine 722 (i.e., how much of the datastore the virtual machine can write to), the cache name 724, the cache mode 726 (i.e., read only, write-through, etc), the block size for data written to the datastore 728, and the replacement policy for the datastore 730 (e.g., FIFO, LIFO, etc.). FIG. 7D depicts performance screen 732 showing cache statistics for a particular datastore, and includes graphs on the number of reads/writes to the cache.

The display pages of FIGS. 7A-7D are exemplary of the GUIs that may be initiated by embodiments of the present disclosure to perform the functions herein. Other GUIs may be created that will help with efficiency of datastore entry, add additional features, or further facilitate caching data from virtual machines. Accordingly not all embodiments of such GUIs have been described herein, but will be apparent to one of skill in the art. Various GUIs may be used instead of or in addition to the GUIs described herein, and the GUIs are in no way to be considered limiting to the specification and claims, but are used for exemplary purposes only.

The terms "SSD", "SSD device", and "SSD drive" as used herein are meant to apply to various configurations of solid state drive devices equipped with SSD controllers and devices in accordance with one or more of the various embodiments of the disclosed subject matter. It will be understood that other types of non-volatile mass storage devices in addition to flash memory devices may also be utilized for mass storage.

Those of skill in the art would appreciate that the various illustrations in the specification and drawings described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

Moreover, in the drawings and specification, there have been disclosed embodiments of the inventions, and although specific terms are employed, the term are used in a descriptive sense only and not for purposes of limitation. For example, various servers have been described herein as single machines, but embodiments where the servers comprise a plurality of machines connected together is within the scope of the disclosure (e.g., in a parallel computing implementation or over the cloud). Moreover, the disclosure has been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for caching data from a plurality of virtual machines, the method comprising:
   detecting, using a computer processor executing cache management software, initiation of migration of a cached virtual machine from a first virtualization platform to a second virtualization platform, wherein the cache management software is implemented as a virtual machine between a virtual machine file system of a hypervisor and source storage external to the hypervisor and is exposed to the hypervisor as a storage device, wherein the virtual machine file system has a direct data path to the source storage with a low priority and wherein implementation of the cache management software as a virtual machine between the virtual machine file system and the source storage provides a redundant data path between the virtual machine file system and the source storage, the redundant data path having a high priority and providing data communication including data caching for the plurality of virtual machines through the cache management software utilizing the redundant data path, wherein in the event of failure of the cache management software, data communication is performed utilizing the direct data path;
   disabling caching in a cache storage, using the cache management software, for the virtual machine on the first virtualization platform, wherein the disablement of caching is in response to the cache management software detecting initiation of migration, wherein the cache storage is separate from the virtual machine file system and the source storage;
   detecting completion of the migration of the virtual machine to the second virtualization platform; and
   enabling caching in the cache storage for the virtual machine on the second virtualization platform.

2. The method of claim 1, wherein detection of the completion of the migration of the virtual machine to the second virtualization platform is performed using a computer processor executing cache management software.

3. The method of claim 1, wherein at least one of the first virtualization platform and the second virtualization platform comprises a host.

4. The method of claim 1, further comprising:
   invalidating, in the cache storage, one or more blocks associated with the virtual machine on the first virtualization platform subsequent to the disabling of caching for the virtual machine on the first virtualization platform.

5. The method of claim 4, wherein the cache storage comprises a Solid State Device (SSD).

6. A system for caching data from a plurality of virtual machines, the system comprising:
   cache storage;
   a computer having a non-transitory computer memory having stored caching instructions stored in the computer memory configuring the computer to cache data from the plurality of virtual machines, the caching instructions comprising:
      detecting initiation of migration of a cached virtual machine from a first virtualization platform to a second virtualization platform, wherein the caching instructions are implemented as a virtual machine between a virtual machine file system of a hypervisor and source storage external to the hypervisor and is exposed to the hypervisor as a storage device, wherein the virtual machine file system has a direct data path to the source storage with a low priority and wherein implementation of the cache management software as a virtual machine between the virtual machine file system and the source storage provides a redundant data path between the virtual machine file system and the source storage, the redundant data path having a high priority and providing data communication including data caching for the plurality of virtual machines through the cache management software utilizing the redundant data path, wherein in the event of failure of the cache management software, data communication is performed utilizing the direct data path;

disabling caching in the cache storage, using the cache management software, for the virtual machine on the first virtualization platform, wherein the disablement of caching is in response to the cache management software detecting initiation of migration, wherein the cache storage is separate from the virtual machine file system and the source storage;

detecting completion of the migration of the virtual machine to the second virtualization platform; and enabling caching in the cache storage for the virtual machine on the second virtualization platform.

7. The system of claim 6, wherein the cache storage comprises a Solid State Device (SSD).

8. The system of claim 6, wherein at least one of the first virtualization platform and the second virtualization platform comprises a host.

9. The system of claim 6, further comprising:

invalidating, in the cache storage, one or more blocks associated with the virtual machine on the first virtualization platform subsequent to the disabling of caching for the virtual machine on the first virtualization platform.

10. An article of manufacture for caching data from a plurality of virtual machines, the article of manufacture comprising:

at least one non-transitory processor readable storage medium; and instructions stored on the at least one medium;

wherein the instructions are configured to be readable from the at least one medium by at least one processor and thereby cause the at least one processor to operate so as to:

detect initiation of migration of a cached virtual machine from a first virtualization platform to a second virtualization platform, wherein the instructions comprise cache management software which is implemented as a virtual machine between a virtual machine file system of a hypervisor and source storage external to the hypervisor and is exposed to the hypervisor as a storage device, wherein the virtual machine file system has a direct data path to the source storage with a low priority and wherein implementation of the cache management software as a virtual machine between the virtual machine file system and the source storage provides a redundant data path between the virtual machine file system and the source storage, the redundant data path having a high priority and providing data communication including data caching for the plurality of virtual machines through the cache management software utilizing the redundant data path, wherein in the event of failure of the cache management software, data communication is performed utilizing the direct data path;

disable caching in a cache storage, using the cache management software, for the virtual machine on the first virtualization platform, wherein the disablement of caching is in response to the cache management software detecting initiation of migration, wherein the cache storage is separate from the virtual machine file system and the source storage;

detect completion of the migration of the virtual machine to the second virtualization platform; and enable caching in the cache storage for the virtual machine on the second virtualization platform.

11. The article of manufacture of claim 10, wherein the instructions further comprise instructions configured to cause the at least one processor to operate so as to:

invalidate, in the cache storage, one or more blocks associated with the virtual machine on the first virtualization platform subsequent to the disabling of caching for the virtual machine on the first virtualization platform.

\* \* \* \* \*